United States Patent

Bronkal et al.

Patent Number: 5,339,680
Date of Patent: Aug. 23, 1994

[54] SYSTEM AND METHOD FOR SENSING TEMPERATURE

[75] Inventors: Bernhard Bronkal, Koengen; Wolfram Gerwing, Hessigheim; Hermann Grieshaber, Aichtal-Aich; Manfred Birk, Oberriexingen; Gerhard Engel, Stuttgart, all of Fed. Rep. of Germany

[73] Assignee: Robert Bosch GmbH, Stuttgart, Fed. Rep. of Germany

[21] Appl. No.: 893,228

[22] Filed: Jun. 3, 1992

[30] Foreign Application Priority Data

Jun. 19, 1991 [DE] Fed. Rep. of Germany ....... 4120388

[51] Int. Cl.$^5$ ................................................ G01P 5/12
[52] U.S. Cl. .................................................. 73/118.2
[58] Field of Search ................. 73/118.2, 115, 117.3

[56] References Cited

U.S. PATENT DOCUMENTS

| | | | |
|---|---|---|---|
| 4,406,161 | 9/1983 | Locke et al. | 73/118.2 |
| 4,502,325 | 3/1985 | Klomp | 73/118.2 |
| 4,576,039 | 3/1986 | Muto et al. | 73/118.2 |
| 4,750,464 | 6/1988 | Staerzl | 73/118.2 |
| 4,807,151 | 2/1989 | Citron | 73/118.2 |
| 4,884,215 | 11/1989 | Zboralski et al. | 73/118.2 |
| 5,014,550 | 5/1991 | Gee et al. | 73/118.2 |
| 5,060,612 | 10/1991 | Kondo et al. | 73/118.2 |
| 5,167,152 | 12/1992 | Shimizu et al. | 73/118.2 |
| 5,186,045 | 2/1993 | Matsuoka et al. | 73/118.2 |
| 5,191,789 | 3/1993 | Furuya | 73/118.2 |

Primary Examiner—Hezron E. Williams
Assistant Examiner—George M. Dombroske
Attorney, Agent, or Firm—Kenyon & Kenyon

[57] ABSTRACT

A method for sensing the temperature of the air supplied to the combustion chambers of an internal combustion engine for the purpose of detecting air mass. Air temperature can be measured using an inexpensive detector having a transfer function exhibiting a delayed response. Dynamic performance is improved by applying to the detected temperature a temperature correction value that is obtained by applying a transfer function that is substantially the inverse of the transfer function of the temperature detector.

19 Claims, 6 Drawing Sheets

SYSTEM AND METHOD FOR SENSING TEMPERATURE

FIELD OF THE INVENTION

The present invention relates to a system and method for sensing the temperature of the air supplied to the combustion chambers of an internal combustion engine. In particular, the present invention relates to a system and method for detecting the temperature air supplied to the combustion chambers of an internal combustion engine and correcting for the temperature of that air.

BACKGROUND OF THE INVENTION

To adjust the operating parameters, in particular the optimum working points, of an internal combustion engine, the air mass supplied to the engine must be measured. In the case of conventional methods, so-called hot-film or hot-wire air-mass meters are used to detect the air mass.

Generally, to determine air mass, the temperature of the air supplied to the combustion chambers of an internal combustion engine must be measured. For this purpose, temperature detectors are used, which measure the temperature in the intake pipe or in the manifold. In the case of turbo-charged engines, the temperature detector is located between the supercharger and the engine intake.

Preferably, NTC detectors are used as temperature detectors, since they are inexpensive. However, the disadvantage of these temperature detectors is that they react relatively slowly to changes in temperatures, and, thus, have a relatively large time constant.

SUMMARY OF THE INVENTION

The system and method according to the present invention have the advantage that relatively slow and inexpensive temperature sensors can be used to determine temperature and that, nevertheless, a high dynamic measuring performance is attained. This is achieved according to the present invention by correcting the measured value that is determined. The correction value is obtained by applying a transfer function which is the inverse of the transfer function of the temperature detector, i.e., a compensating transfer function. Therefore, the underlying principle of the present invention is to essentially eliminate that characteristic of the inexpensive temperature detector which is comparable to a time-delay element by using a correcting element that is provided with a transfer function which is the inverse of the transfer function of the temperature detector, or which has an effect comparable to a compensator that uses the inverse transfer function. Thus, the inertia of the time-delay element can be compensated for by a differentiator. However, it is not possible to implement an ideal differentiator, and, thus, a certain time constant remains. This is not disturbing, however.

Consequently, the transfer function of the correcting element is not completely, but rather is, essentially, the inverse of the transfer function of the temperature detector. Depending on the design of the circuit arrangement, the transfer function is selected to be an inverse, substantially compensating function.

The term inverse applies to the method illustrated in FIG. 1, and not to block 4 in FIG. 2. An inverse transfer function refers to the reciprocal value of the sensor function and compensation by means of multiplication. In particular, the procedure is such that the transfer function of the temperature detector (sensor) is first determined. The counter's zero digit positions are of particular interest. The transfer function of a temperature detector of a $T_1$-type (time-delay element of the first power) is as follows:

$$\frac{1}{1 + p\, T_F} \quad (1)$$

where p represents a so-called operator, and $T_F$ denotes the time constant of the time-delay element. A correction can then be made using a correcting element having the following transfer function:

$$\frac{1 + p\, T_F^*}{1 + p\, T_V} \quad (2)$$

$T_F^*$, which denotes the time constant of the correcting element, should be selected so that the correction is at least as large as $T_F$. As mentioned above, it is not possible to implement an ideal differentiator, and, thus, a denominator time constant $T_V$ remains. However, $T_v$ is small compared to $T_F$ and $T_F^*$ and, therefore, is not disturbing.

If the transfer function of the temperature detector is not a time-delay element of the first power, but rather of the second power, an appropriate correcting element is provided with two zero digit positions, which correspond to the detector poles. If an analog/digital conversion (A/D conversion) of the measured value is undertaken, spikes appear in the corrected measured value, because the compensation (correction) exhibits differentiating characteristics. For the most part, these spikes are not disadvantageous, but are undesirable. Furthermore, after the A/D conversion in the first change-in-temperature phase (for example during an acceleration operation of the internal combustion engine), there is still no signal change. Therefore, the measured value of the temperature detector cannot be corrected yet. In this respect, the above-mentioned realization does in fact bring a considerable improvement in dynamic performance. However, at the beginning of a change, there is still a certain deviation from the actual temperature progression.

To avoid the preceding problems, a further development of the present invention provides that, to formulate the correction value, the charge-air pressure or the intake-air pressure (also referred to herein as air pressure) is determined, and a simulation temperature is formulated based thereon. The simulation temperature is directed through a first compensating transfer element. Thus, the basic idea is to draw upon the dynamically and quickly measured air pressure, which exists already, for example, in a diesel engine's EDC system (i.e., electron diesel control system), to compensate for the relatively slowly reacting NTC temperature detector.

A change in the air pressure (for example, because of an acceleration operation) leads to a corresponding change in the temperature. However, this is indicated by the NTC temperature detector only after a delay. By means of the differentiation, the simulation temperature determined from the air pressure is converted into a correction value, which is added to the measured value. The result is the availability of a corrected measured value having good dynamic performance.

In particular, a temperature detector is used, the transfer function of which is that of a time-delay element, in particular a $T_1$-element. Accordingly, the transfer function of the first transfer element exhibits the character of a differentiator, in particular a D-differentiator or DT1-differentiator.

To allow for the outside air pressure, i.e., the air pressure of the surroundings of the internal combustion engine, the simulation temperature is influenced in accordance with the magnitude of the outside air pressure. The influence of the outside air temperature and the outside air pressure on the temperature detector located in the manifold follows automatically because of the physical conditions.

Preferably, to formulate the simulation temperature, a differentiation of the air pressure is undertaken. The value obtained from the air-pressure sensor is amplified by using the following factor:

$$\frac{dT_2}{dP_2} \quad (3)$$

In this case, the amplification factor corresponds to the differential amplification of $\Delta P_2$ to $\Delta T_2$, where $T_2$ represents the temperature in the manifold, and $P_2$ represents the charge-air pressure or intake-air pressure. The outside air pressure is referred to herein as $P_1$ and the outside air temperature as $T_1$. A characteristic curve can be used for this amplification. If the outside air pressure also is to be considered, an engine characteristics map is used in place of the characteristic curve. That is, the individual values of the engine characteristics map are influenced by the outside air pressure.

A further aspect of the present invention provides for the measured value to be fed to a second transfer element, which compensates for both the dynamic performance of the $T_2$ sensor having PDT1 performance characteristics and for its output value or the corrected measured value, depending on which of the two values is greater, to be drawn upon to determine the temperature.

According to another embodiment of the present invention, the measured value can also be fed to a third transfer element having DT1 performance characteristics. The measured value is added to its output value to formulate another corrected measured value and, in each case, the corrected or the further corrected measured value, depending on which of the two values is greater, is drawn upon.

When an internal combustion engine, which has heated-up as the result of a previous operating phase, is restarted, a further aspect of the present invention provides for a correction value which corresponds to the subsequent heating of the temperature detector due to the after-heating phase. The correction value is subtracted, in particular, from the simulation temperature.

Furthermore, it is advantageous when the correction value is a quantity that is capable of being connected to the system. In particular, several correction values can be selected, wherein the correction value that is selected and applied to the system is determined dependent upon the heating temperature of the temperature detector.

A further embodiment of the present invention provides for the correction value to be applied to the system only when the heating temperature, or a temperature of a component (for example, the manifold of the internal combustion engine) corresponding to the heating temperature, exceeds a preselected threshold value.

The present invention further relates to a system and method for determining the temperature of the air supplied to the combustion chambers of an internal combustion engine, in particular for measuring air mass, in which a correction value is applied to the calculated temperature value to improve dynamic performance. The temperature value is determined by means of simulation, in that the outside air temperature, the rotational frequency of the internal combustion engine, and the charge-air or intake-air pressure are allowed for. These parameters, preferably, are fed to an engine characteristics map, which determines the static value of the temperature. To allow for dynamic influences, a correction value which affects the static temperature value is provided. To this end, the change in the rotational frequency of the internal combustion engine, as well as the change in the charge-air or intake-air pressure, is determined. The differential quantities thus serve to correct the static temperature value.

DETAILED DESCRIPTION OF THE INVENTION

Figure 1:
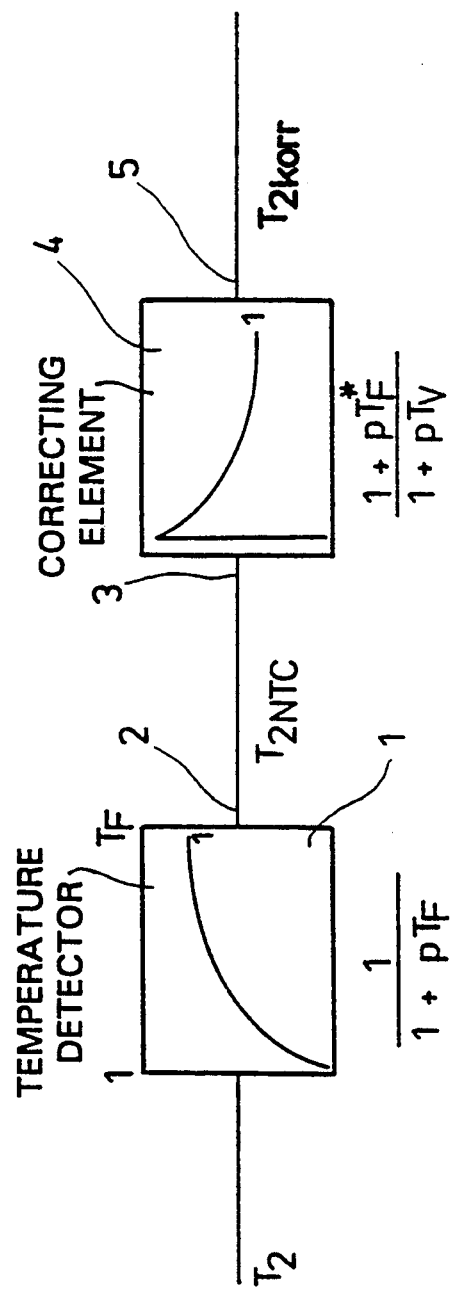
FIG. 1 shows a block diagram of a first embodiment of the present invention.

FIG. 1 shows a temperature detector 1, which is designed as an NTC temperature detector and, therefore, reacts relatively slowly to changes in temperature. In this respect, the temperature detector 1 exhibits the characteristic of a time-delay element. If the detector acts as a time-delay element of the first power, it possesses the following transfer function as stated:

$$\frac{1}{1 + p\, T_F}$$

The temperature detector 1 is located in the manifold of an internal combustion engine to determine the temperature of the air supplied to the internal combustion engine. Therefore, in the case of naturally aspirated engines, the temperature of the intake air is measured. In the case of turbocharged engines, the temperature of the air compressed by the supercharger is measured. In the case of turbocharged engines, the temperature detector 1 is situated between the supercharger and the engine intake.

A relatively slow temperature detector 1 is relatively inexpensive. However, dynamic operations can be measured only with a delay. Therefore, according to the present invention, to increase dynamic performance, a correction of the measured value determined by the temperature detector 1 is made.

It is apparent from FIG. 1 that the temperature detector 1 is exposed to the temperature $T_2$ of the air supplied to the internal combustion engine. The measured value $T_{2NTC}$ is available at the output 2 of the temperature detector 1. This measured value $T_{2NTC}$ is fed to the input 3 of a correcting element 4. In contrast to the temperature detector 1, the correcting element's transfer function exhibits differentiating performance characteristics. The transfer function as stated is as follows:

$$\frac{1 + p\, T_F^*}{1 + p\, T_V}$$

The transfer functions of the temperature detector 1 and of the correcting element 4 are adjusted to one another to such an extent that the following relationship applies:

$$T^*_F = T_F \qquad (4)$$

The denominator time constant $T_V$ results from the fact that it is not possible to implement an ideal differentiator as a correcting element 4. However, the time constant $T_V$ is small compared to the time constants $T_F$ and $T^*_F$ and, therefore, does not cause a disturbance.

If the temperature detector 1 is a time-delay element of the second power, or of a still greater power, an appropriate transfer function is provided in each case for the correcting element 4. Because of the correction according to the present invention, the goal is for the total response characteristic of the temperature detector 1 and the correcting element 4 to have a value approximately equal to one. As a result, a corrected measured value $T_{2korr}$ for the temperature of the air is available at the output 5 of the correcting element 4.

If the measured value derived from the temperature detector I is fed to an analog/digital converter to enable further digital processing, undesirable spikes can occur in the corrected measured value $T_{2korr}$, because of the differentiating performance of the correcting element 4. Furthermore, in the seconds immediately after an increase in temperature (for example, at the beginning of an acceleration of a motor vehicle equipped with the internal combustion engine), there is still no signal change after the analog/digital conversion, so that the temperature measured by the temperature detector 1 cannot be corrected yet. Consequently, a considerable improvement in temperature measurement is produced. However, the beginning of a change in temperature is not measured with optimum accuracy with respect to the physical signal. To eliminate the above-mentioned disadvantages, further embodiments of the present invention are provided.

Figure 2:
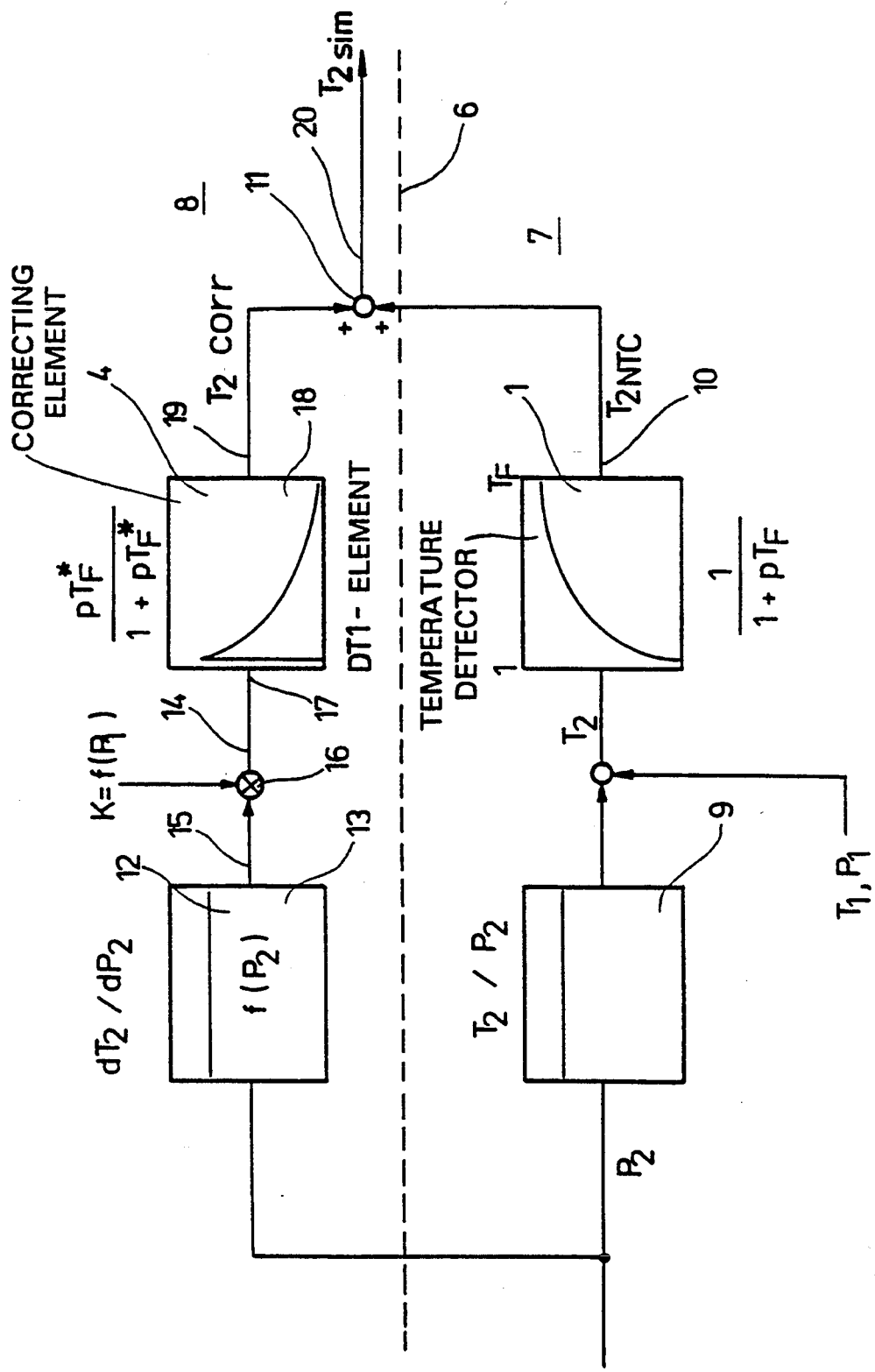
FIG. 2 shows a block diagram of a second embodiment of the present invention.

FIG. 2 shows a correction of the measured value $T_{2NTC}$ by means of a correction quantity acquired from the air pressure $P_2$. The basic idea is to draw upon the air pressure $P_2$, which is measured quickly and dynamically and is available, for example, in an EDC system (electronic diesel control system) to compensate for the slow temperature detector 1 (NTC temperature detector).

The dotted line 6 in FIG. 2 subdivides the diagram into two regions, i.e., physics in region 7 and simulation in region 8.

Region 7 for physics will first be described. The air pressure $P_2$ (charge air pressure in the case of an internal combustion engine with a turbo-charger) in the manifold determines the temperature $T_2$ of the air in the manifold in accordance with the polytropic gas equation in block 9, and because of the influence of the outside air temperature $T_1$ (ambient air temperature) and of the outside air pressure $P_1$. The temperature $T_2$ acts upon the temperature detector 1, at the output of which 10 the measured value $T_{2NTC}$ is available. Once again, the transfer function of the temperature detector 1 is as follows:

$$\frac{1}{1 + p\, T_F}$$

The measured quantity $T_{2NTC}$ is fed, with a positive sign, to a summing point 11. The summing point 11, similar to the following components, belongs to region 8 of the simulation. A component 12 also is provided with a characteristic curve 13, which calculates a simulation temperature 14 from the air pressure $P_2$. Thus, based on the characteristic curve 13, the simulation temperature 14 is dependent upon the air pressure $P_2$ ($f(P_2)$). This is achieved in the simulation of the gas equation. Consequently, the characteristic curve 13 corresponds to the following expression:

$$\frac{dT_2}{dP_2}$$

A multiplication point 16 is provided at the output 15 of component 12. A severity factor K, which allows for the influence of the outside air pressure $P_1$, is fed, as a further input quantity, to the multiplication point 16. The following relationship applies:

$$K = f(P_1) \qquad (5)$$

The simulation temperature 14, which is supplied to the input 17 of a correcting element 4, is available at the output of the multiplication point 16. The correcting element 4 represents a transfer element 18, the transfer function of which is selected so that the inertia of the temperature detector is compensated for dynamically. In the embodiment of FIG. 2, the transfer element 18 is a DT1 element having the following transfer function:

$$\frac{p\, T_F^*}{1 + p\, T_F^*} \qquad (6)$$

Again, the following relationship applies:

$$T^*_F = T_F$$

A correction value $T_{2corr}$, which is fed with a positive sign as an input quantity to the summing point 11, is available at the output 19 of the transfer element 18. Therefore, a measured value, corrected by simulation, of the temperature $T_{2\,sim}$ of the air is made available at the output 20, and can be further processed in an appropriate, desired manner. It can be used, for example, to measure the air mass supplied to the internal combustion engine. The outside air pressure $P_1$ can be considered by using measurement means such as an altimeter or by using detection means, together with the sensor detecting the air pressure $P_2$, for example, when the internal combustion engine is idling.

In the embodiment of FIG. 2, instead of measuring the air pressure $P_2$, the air pressure $P_2$ can be used by means of a simulation as an input quantity for the $T_2$ correction.

Figure 3:
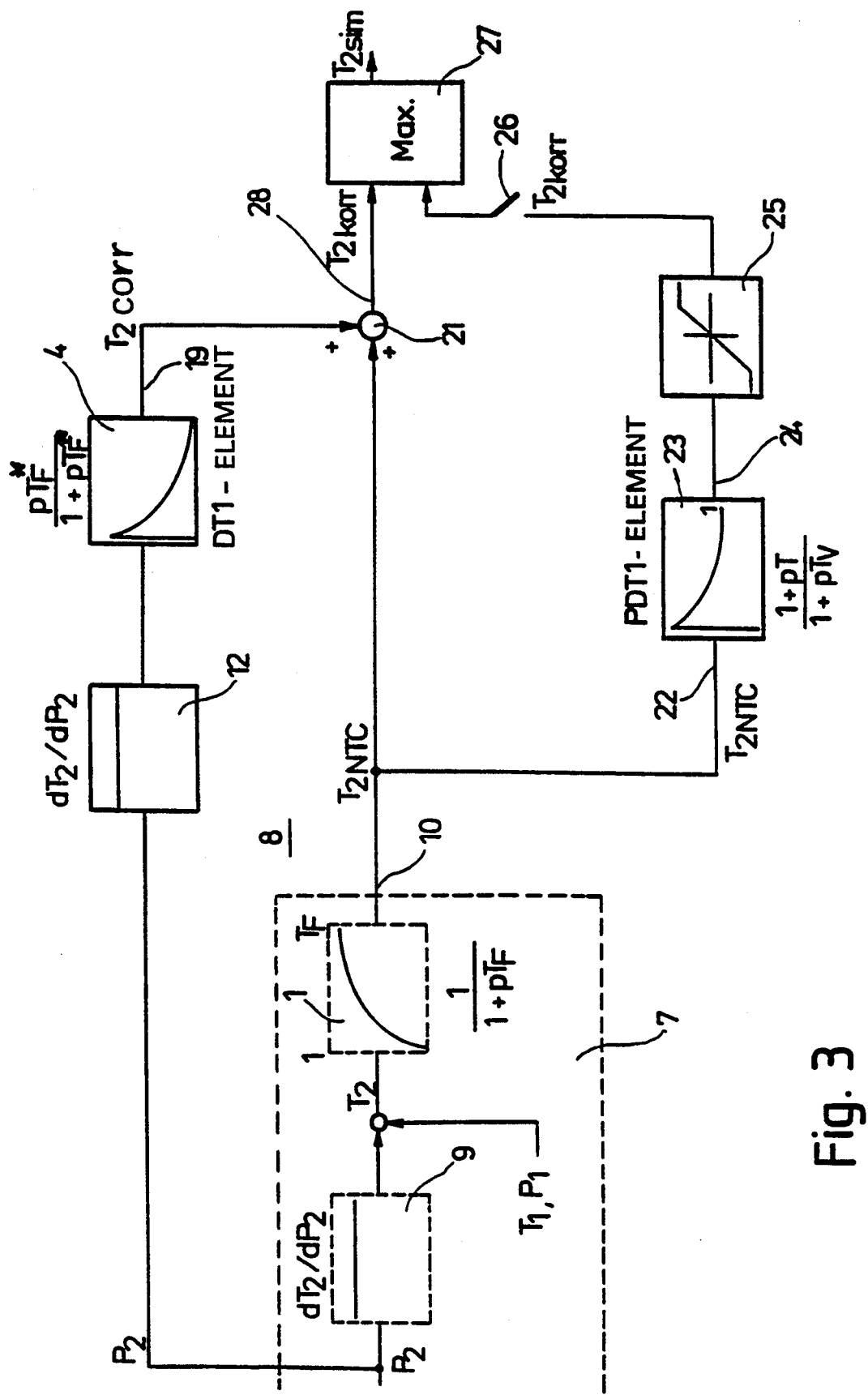
FIG. 3 shows a block diagram of a third embodiment of the present invention.

FIG. 3 shows another embodiment of the present invention. Again, there is a region 7 that relates to physics and a region 8 that relates to simulation. The temperature $T_2$ of the air, which is also influenced by the outside air temperature $T_1$ and the outside air pressure $P_1$, is calculated from the air pressure $P_2$ through application of the gas equation in block 9. The temperature $T_2$ of the air is measured by the temperature detector 1, which exhibits the following transfer function:

$$\frac{1}{1+pT_F}$$

The measured value $T_{2NTC}$ is available at the output 10 of the temperature detector 1. Furthermore, the air pressure $P_2$ is directed via a differentiating component 12 to a correcting element 4 having the following transfer function:

$$\frac{pT_F{}^*}{1+pT_F{}^*}$$

In the same way as in the embodiment of FIG. 2, the correcting element 4 is a DT1 element in the embodiment of FIG. 3. The correction value $T_{2corr}$ is available at the output 19 of the correcting element 4, and is fed to a summing point 21 with a positive sign. The summing point 21 also receives the measured value $T_{2NTC}$ as a further input quantity. This is further fed to the input 22 of a transfer element 23 having PDT1 performance characteristics. The transfer element 23 has the following transfer function:

$$\frac{1+pT}{1+pT_V} \quad (7)$$

The time constants are selected so that the sum of $T_K$ and $T_V$ approximately equals $T_F$. The output 24 of the transfer element 23 is supplied via a limiter circuit 25 and a switch 26 to an evaluation circuit 27. The output 28 of the summing point 21 is also connected to the evaluation circuit 27. The evaluation circuit 27 checks whether the corrected measured value $T_2{}_{korr}$ formulated by means of the transfer element 23 or the other corrected measured value $T_2{}_{korr}$ applied to the output 28 of the summing point 21 is greater. The greater of the two values is retrieved to determine the temperature $T_2{}_{sim}$.

Figure 4:
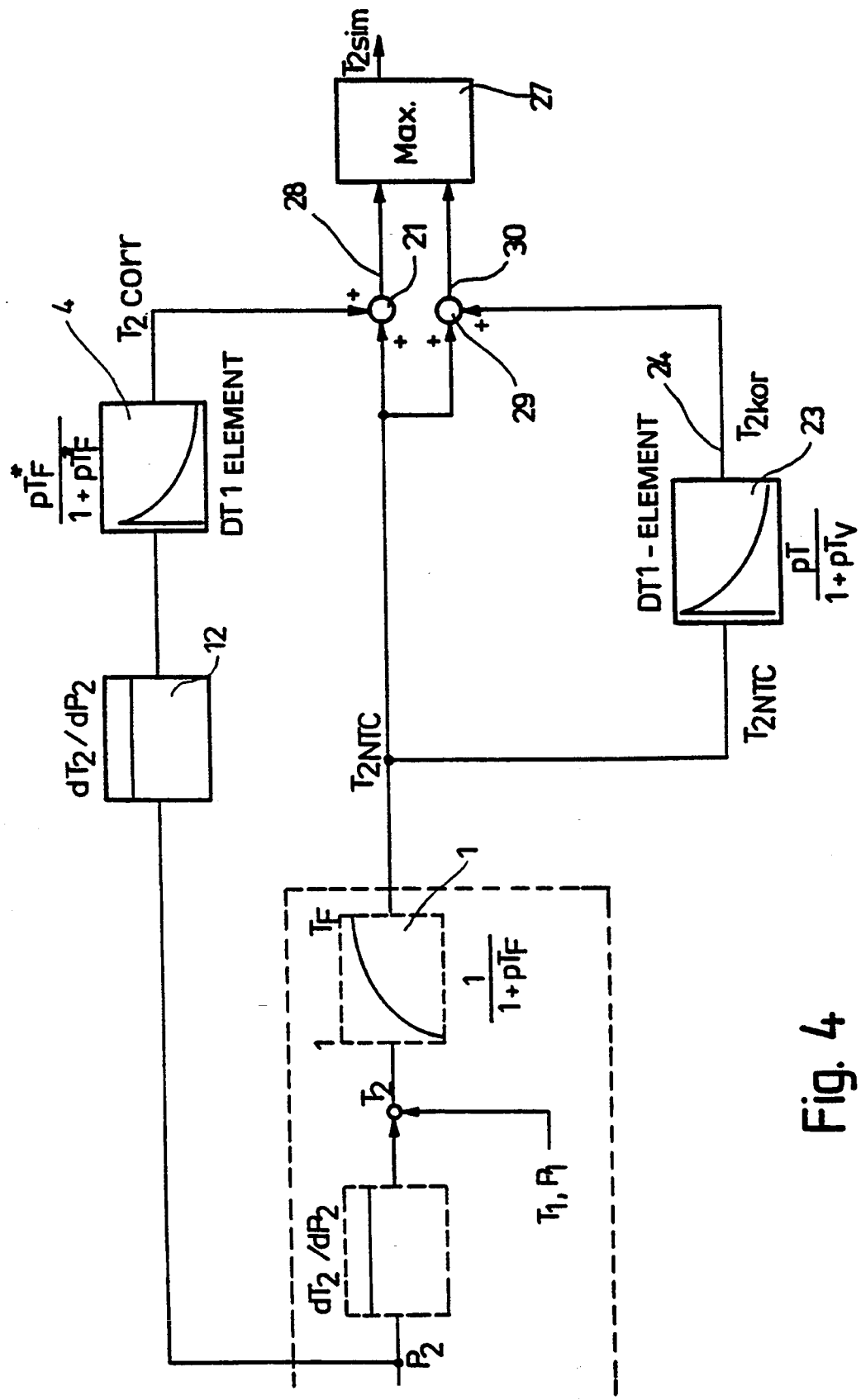
FIG. 4 shows a block diagram of a fourth embodiment of the present invention.

Another embodiment of the present invention is shown in FIG. 4. It differs from the embodiment of FIG. 3 simply in that the transfer element 23 is not designed as a PDT1 element, but rather as a DT1 element. Furthermore, the output 24 of the transfer element 23 is connected, with a positive sign, to a summing point 29, which receives the measured value $T_{2NTC}$ as a further input quantity. The output 28 of the summing point 21 and the output 30 of the summing point 29 are both connected to the evaluation circuit 27, which determines the greater of the two values and makes it available as the temperature $T_2{}_{sim}$.

In the embodiments of FIGS. 3 and 4, an excellent conformity is guaranteed between the determined temperature $T_2$ and the actually existing temperature, even at the beginning of a temperature increase (for example, due of an acceleration operation). After the first 10 to 15 seconds of an acceleration operation, there is an excellent conformity with the actual temperature through the $P_2$-branch that has the correcting element 4. No correcting interventions are possible in the range from 50 seconds to approximately 150 seconds, since the air pressure $P_2$ is constant during this time period. Therefore, a correction is made within the mentioned range by means of the $T_2$-branch that has the transfer element 23 through the gradient formation of the signal coming from the temperature detector 1.

The goal of the systems depicted in the embodiments of FIGS. 3 and 4 is, therefore, to cause the frequency response characteristic of the temperature detector 1 to be corrected. This frequency response characteristic not only compensates for a simple low-pass performance characteristic, but also allows for a second time constant that describes the influence of the manifold. This second time constant is compensated for in FIG. 3 or 4 by block 23.

According to another aspect of the embodiments of FIGS. 3 and 4, it is also possible for the evaluation circuit 27 to be corrected only by means of the $P_2$-branch when there is a large gradient of the air pressure $P_2$, so that the $T_2$-branch is not operative. On the other hand, it is also possible, in the case of small $P_2$ gradients, to correct only by means of the $T_2$-branch, while the $P_2$-branch is not operative. The branches that are not active at the time can be made inoperative, for example, by a switch.

The input quantities of the transfer elements 23 can also be freezed. The advantage of this is that the prior history of the particular branch remains active for the temperature correction.

Figure 5:
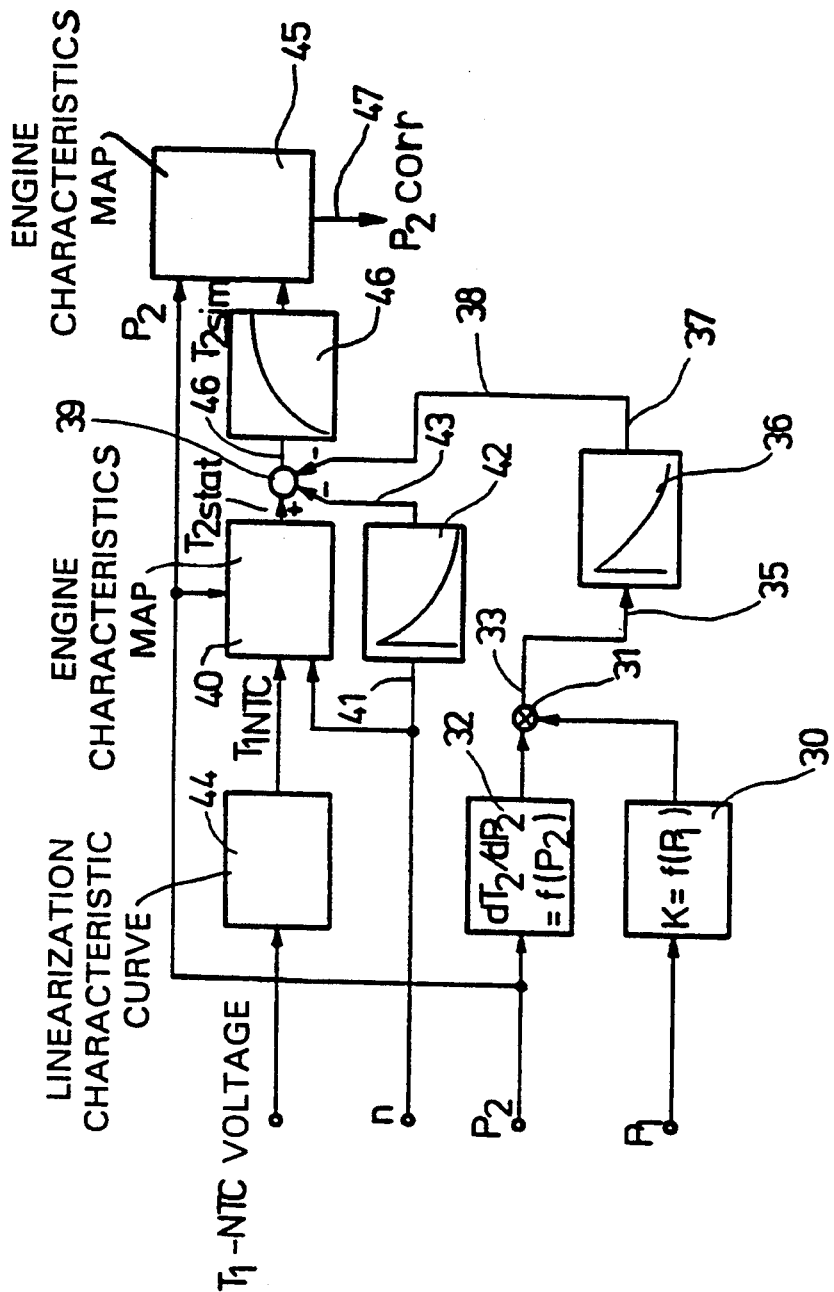
FIG. 5 shows a block diagram of a fifth embodiment of the present invention.

The embodiment of FIG. 5 provides for a $T_2$-simulation dependent upon the (measured) outside air temperature $T_1$ and the (measured or simulated) air pressure $P_2$, as well as upon the rotational frequency n. The outside air pressure $P_1$ (atmospheric air pressure) is supplied via a characteristic curve 30 having the function:

$$K = f(P_1)$$

to a multiplication point 31. The air pressure $P_2$ is likewise transferred as an input quantity via a characteristic curve 32 having the function:

$$\frac{dT_2}{dP_2} = f(P_2) \quad (8)$$

to the multiplication point 31. The output 33 of the multiplication point 31 is connected to a differentiator 36 (DT1-element), the output of which 37 leads, with a negative sign, to a summing point 39. The rotational frequency n of the internal combustion engine is determined and fed to an engine characteristics map 40. The rotational frequency n is also fed to the input 41 of a differentiator 42, the output of which 43, with a negative sign, leads to the summing point 39.

Moreover, the ambient temperature (outside air temperature $T_1$) is measured by a temperature detector, which can be designed as an NTC detector, and the $T_{1NTC\ voltage}$ supplied by the detector is fed to a linearization characteristic curve 44, at the output of which the temperature $T_{1NTC}$ is available. This temperature is then applied as an input quantity to the engine characteristics map 40. In addition, the engine characteristics map 40 receives the air pressure $P_2$ as a further input quantity, which is supplied in addition to an engine characteristics map 45 that corrects charge-air pressure. The output of the engine characteristics map 40, to which the temperature $T_{2stat}$ is applied, is connected, with a positive sign, as a further input to the summing point 39. The output 46 of the summing point 39 is connected via a time-delay element 46 to the engine characteristics map 45 that corrects charge-air pressure, at the output of which 47 the corrected air pressure $P_{2 corr}$ is available.

Thus, in the case of the embodiment of FIG. 5, a correction follows by means of the gradients of the rotational frequency n and the air pressure $P_2$, through which means dynamic errors are minimized.

Figure 6:
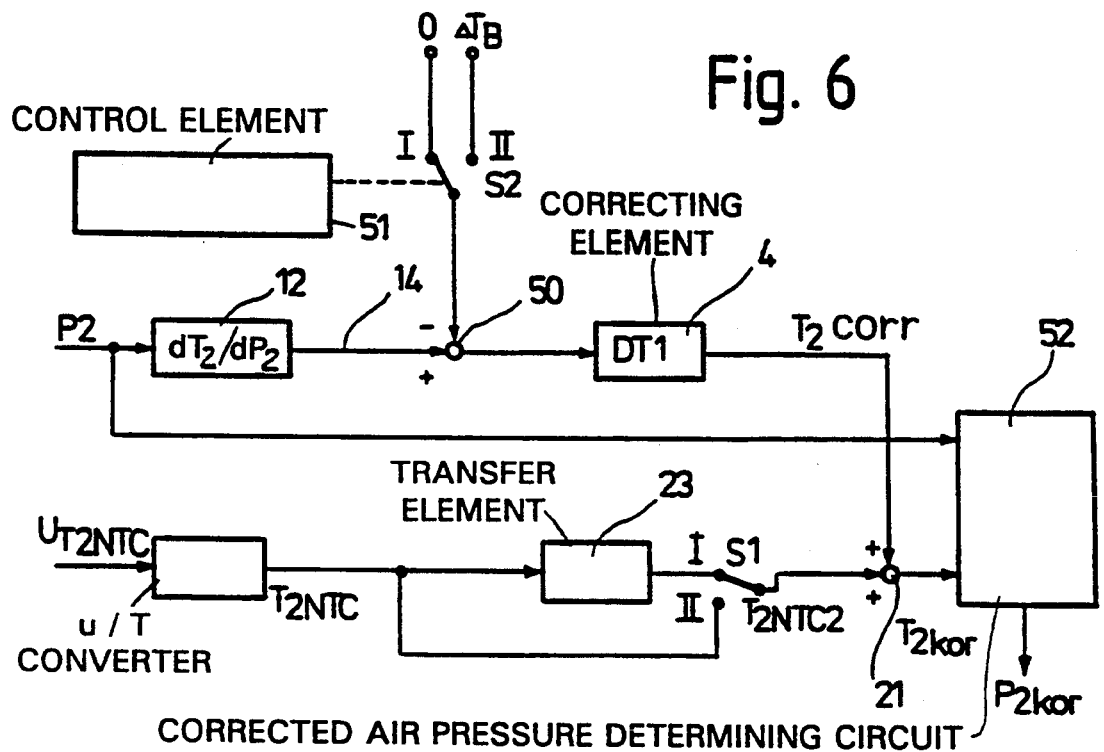
FIG. 6 shows a block diagram of an embodiment of the present invention that expands the embodiment shown in FIG. 3.

FIG. 6 shows another embodiment of the present invention, which differs from the embodiment of FIG. 3 in that a correction value $\Delta T_B$ is also applied. If the internal combustion engine is shut off, for example, after full-load operation, the temperature detector detects the manifold temperature of the internal combustion engine, provided that the temperature detector is installed there. Since high ambient temperatures (about 100° C. and more) prevail there, the temperature detector will heat-up considerably, so that measuring errors occur when the internal combustion engine is restarted during the above-mentioned after-heating phase. Special problems occur at high altitudes, particularly on mountains, for example, when the actual air temperature is about 30° C. and too high of a temperature (for example, 100° C.) is detected. This causes the fuel quantity to be limited. Since the air pressure at high altitudes (for example, 2000 meters) is small, in the full-load state, start-up problems as a result of the fuel quantity being too small have to be expected.

The embodiment shown in FIG. 6 provides a means for correcting this. The air pressure $P_2$ is supplied to the component 12, which generates the simulation temperature 14 at its output. This is applied, with a positive sign, to a summing point 50. A further input of the summing point 50 is connected, with a negative sign, to a switch $S_2$, which can be actuated by a control element 51. By this means, a correction value $\Delta T_B$ can be supplied, depending on the switch position, to the summing point 50. This occurs when the switch $S_2$ is transferred by the control element 51 to position II. If the switch $S_2$ is in position I, the correction value $\Delta T_B = 0$, i.e., no additional electric current is applied.

The output of the summing point 50 is connected to the correcting element 4, which is designed as a DT1 element. The output of the correcting element has a value $T_{2 corr}$, which is supplied, with a positive sign, to the summing point 21. The voltage $U_{T2NTC}$ is supplied by the temperature detector, and the measured value $T_{2NTC}$ is calculated from this voltage. This measured value $T_{2NTC}$ is fed to the transfer element 23 and also to a switch $S_1$. Another pole of the switch $S_1$ is connected to the output of the transfer element 23. The value $T_{2NTC2}$ is applied to the base of the switch $S_1$ and is supplied, with a positive sign, to the summing point 21. The output value of the summing point 21 is applied to a circuit 52, which receives the air pressure $P_2$ as a further input quantity. The corrected air pressure $P_{2kor}$ is available at the output of the circuit 52. If the switch $S_1$ is situated in position I, the output value of the transfer element 23 is fed to the summing point 21. In position II of the switch $S_1$, the transfer element 23 is bypassed, that is, the measured value $T_{2NTC}$ is fed directly to the summing point 21.

Preferably, the correction value $\Delta T_B$ is considered only after a threshold value $T_S$ has been exceeded. In other words, a switch-over is made by means of the control element 51 to switch position II of the switch $S_2$ only after the threshold value is exceeded. This can be the case, for example, when the temperature $T_{2NTC}$ is greater than $T_S = 70°$ C. Switching-over the switch $S_2$ results in a sudden upwards jump of height $\Delta T_B$ at the input of the DT1 element 4. The value $T_{2corr}$ likewise leads first to a downwards jump of $\Delta T_B$. This jump then builds up with the time constant $T_{GN2}$, the so-called dominant sensor time constant. If the sensor (temperature detector) is very sluggish, the starting correction resulting from the switch-over decays slowly. This corresponds to the physically necessary correction in that the temperature detector takes quite a while to determine the correct temperature because of its sluggish dynamic performance.

Figure 7:
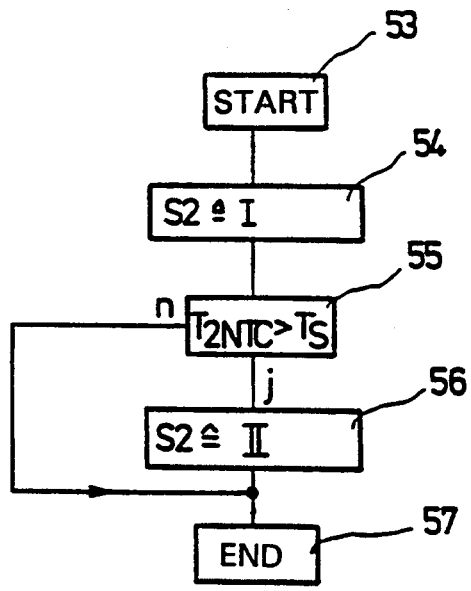
FIG. 7 shows a flow chart illustrating a method according to the present invention.

FIG. 7 shows a flow diagram for the start of injection (actuation of $S_2$) after the internal combustion engine is started. If the relation $$T_{2NTC} > T_S \qquad (9)$$

applies after the engine has been started and is running, the switch-over is made from switch position I (no start-injection) to position II (with start-injection). The threshold value $T_S$ may have the following values:

$$50° \text{ C.} < T_S < T_{max}, \qquad (10)$$

where $T_{max}$ is the maximum measuring temperature of the temperature detector.

The correction value $\Delta T_B$ is likewise a quantity that can be applied to lower the temperature that had mistakenly been measured at too high of a value because the temperature detector was heated after the internal combustion engine had been shut-off and restarted.

According to an embodiment which is not shown in the drawings, different correction values can be allocated to various after-heating temperatures. For different temperatures, the following could be provided, for example:

$\Delta T_{B1} = 15°$ C.,
$\Delta T_{B2} = 30°$ C.,
$\Delta T_{B3} = 45°$ C.,
$\Delta T_{B4} = 60°$ C.

Depending on the after-heating temperature of the internal combustion engine or the temperature detector, an appropriate correction value, which eliminates the measuring error, is applied.

FIG. 7 shows the above-mentioned flow diagram. Step 53 denotes the start, which is followed by a test step 54 to check whether the switch $S_2$ is in position I. This is the starting situation, which corresponds to a normal temperature correction. Step 55 tests whether the temperature $T_{2NTC}$ is greater than the threshold value $T_S$. If so (j=yes), the switch $S_2$ is moved to position II in step 56, so that the correction value $\Delta T_B$ is injected. If the condition of step 55 is not satisfied (n=no), step 56 is not carried-out. The procedure then ends with step 57.

An advantage of the design according to the present invention is that it allows the use of an inexpensive temperature detector. Consequently, the quality of the full-load condition of the internal combustion engine (for diesel engines, the emission) is considerably improved by applying the principles of the present invention.

What is claimed is:

1. A method of determining an amount of air flowing into an internal combustion engine, comprising the steps of:
   detecting the temperature of the air flowing into the engine through the use of a temperature detector having a first transfer function, and generating a detected temperature value based thereon; and
   applying a second transfer function to the detected temperature value for correcting the detected temperature value and for generating a corrected temperature value indicative of the amount of air flowing into the engine,
   wherein the first transfer function includes a transfer function of a time-delay element and the second transfer function includes a substantially reciprocal function of the first transfer function.

2. The method as recited in claim 1, wherein the second transfer function includes a transfer function of a differentiator.

3. A method of determining an amount of air flowing into an internal combustion engine, comprising the steps of:
   detecting a temperature of the air flowing into the engine with the use of a temperature detector having a first transfer function, and generating a detected temperature value based thereon;
   determining a pressure of the air flowing into the internal combustion engine, and generating a simulation temperature value based thereon;
   generating a temperature correction value by applying a second transfer function to the simulation temperature value; and
   adding the temperature correction value to the detected temperature value for generating a corrected temperature value indicative of the amount of air flowing into the engine.

4. The method as recited in claim 3, wherein the sum of the first and second transfer functions is approximately one.

5. The method as recited in claim 3, wherein the first transfer function includes a transfer function of a time-delay element.

6. The method as recited in claim 3, wherein the second transfer function includes a transfer function of a differentiator.

7. The method as recited in claim 3, wherein the simulation temperature value is based on an outside air pressure.

8. The method as recited in claim 3, wherein the step of generating the simulation temperature value includes using an engine characteristics map.

9. The method as recited in claim 3, wherein the step of generating the simulation temperature value includes following a characteristic curve.

10. The method as recited in claim 9, wherein the characteristic curve corresponds to a derivative of the simulation temperature with respect to the air pressure.

11. The method as recited in claim 3, wherein the method further comprises the steps of applying a third transfer function to the detected temperature value, generating a third transfer function output value based thereon, and choosing the larger of the corrected temperature value and the third transfer function output value.

12. The method as recited in claim 11, wherein the method further comprises the steps of adding the third transfer function output value to the detected temperature value, generating a further corrected temperature value based thereon, and choosing the larger of the corrected temperature value and the further corrected temperature value.

13. The method as recited in claim 3, wherein the method further comprises a step of formulating the temperature of the air flowing into the engine based on an outside air temperature, a rotational frequency of the engine, and the pressure of the air.

14. The method as recited in claim 13, wherein a characteristic map performs the formulating step.

15. The method as recited in claim 3, wherein the method further comprises the step of applying a correction value to the detected temperature value when the engine is restarted.

16. The method as recited in claim 15, wherein the method further comprises a step of subtracting the correction value from the simulation temperature value.

17. The method as recited in claim 15, wherein the method further comprises a step of selecting the correction value from a plurality of possible correction values based upon the temperature of the temperature detector.

18. The method as recited in claim 15, wherein the correction value is applied only when the temperature of the temperature detector exceeds a predetermined threshold value.

19. The method as recited in claim 15, wherein the correction value depends upon a change in the pressure of the air and a change in the rotational frequency of the engine.

* * * * *